(12) United States Patent
Endo (10) Patent No.: US 7,140,707 B2
(45) Date of Patent: Nov. 28, 2006

(54) IMAGE-FORMING DEVICE

(75) Inventor: Yoshinori Endo, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 225 days.

(21) Appl. No.: 10/694,750

(22) Filed: Oct. 29, 2003

(65) Prior Publication Data

US 2004/0086284 A1    May 6, 2004

(30) Foreign Application Priority Data

Oct. 31, 2002    (JP)    ............................. 2002-316953

(51) Int. Cl.
*B41J 29/38*    (2006.01)
*B41J 29/393*    (2006.01)

(52) U.S. Cl. .......................................... 347/14; 347/19

(58) Field of Classification Search .................... 347/3, 347/14, 19, 50; 358/1.12–1.14; 399/10
See application file for complete search history.

(56) References Cited

U.S. PATENT DOCUMENTS

| | | | |
|---|---|---|---|
| 5,038,319 A | 8/1991 | Carter et al. | |
| 5,790,779 A | 8/1998 | Ben-Natan et al. | |
| 5,982,995 A | 11/1999 | Covert et al. | |

FOREIGN PATENT DOCUMENTS

| | | |
|---|---|---|
| EP | 0 259 144 A2 | 3/1988 |
| EP | 0 685 818 A2 | 12/1995 |
| JP | A 57-139765 | 8/1982 |
| JP | A 63-39268 | 2/1988 |
| JP | A 5-3859 | 1/1993 |
| JP | A 5-75853 | 3/1993 |
| JP | A 05-221096 | 8/1993 |
| JP | A 07-001795 | 1/1995 |
| JP | A 7-205247 | 8/1995 |
| JP | A 08-152818 | 6/1996 |
| JP | A 11-307569 | 11/1999 |
| JP | A 2000-127572 | 5/2000 |
| JP | A 2001-287254 | 10/2001 |
| JP | A 2001-337807 | 12/2001 |
| JP | A 2002-149380 | 5/2002 |

*Primary Examiner*—An H. Do
(74) *Attorney, Agent, or Firm*—Oliff & Berridge, PLC (57) ABSTRACT

By executing a storage control program, a CPU core stores in a time series detection signals from sensors, operation signals outputted to operating members, and error detection results in a ring buffer of a RAM whenever a change occurs in any of these data. The CPU core outputs the data stored in the ring buffer to a personal computer, for example, based on an output program. Accordingly, an operator can view the history of detection signals outputted from the sensors and the operation signals outputted to the operating members up to the point that the error is generated on the CRT screen of the personal computer. The operator can easily analyze the cause of the generated error.

35 Claims, 5 Drawing Sheets

07h, 20h, 07h, 31h, FFh, 30h, 01h, 31h, 02h, 30h,
01h, 31h, 01h, FFh, 00h, 54h, 01h, 30h, FFh, FEh, 00h, 54h, ···

| | | | |
|---|---|---|---|
| <data> | | | |
| Data0 | time | (07h) | 70msec |
| | Sensor | (20h) | Sensor 2 = low |
| Data1 | time | (07h) | 70msec |
| | Sensor | (31h) | Sensor 3 = high |
| Data2 | time | (FFh) | overflow |
| | Sensor | (30h) | Sensor 3 = low |
| Data3 | time | (01h) | 10msec |
| | Sensor | (31h) | Sensor 3 = high |
| Data4 | time | (02h) | 20msec |
| | Sensor | (30h) | Sensor 3 = low |
| Data5 | time | (01h) | 10msec |
| | Sensor | (31h) | Sensor 3 = high |
| Data6 | time | (01h) | 10msec |
| | Sensor | (FFh) | error set |
| | time | (00h) | |
| | Sensor | (54h) | JAM |
| Data7 | time | (01h) | 10msec |
| | Sensor | (30h) | Sensor 3 = low |
| Data8 | time | (FFh) | overflow |
| | Sensor | (FEh) | error clear |
| | time | (00h) | |
| | Sensor | (54h) | JAM |

```
<data>
Data0    time    (07h)   70msec
         Sensor  (11h)   Sensor 1 = high
Data1    time    (05h)   50msec
         Sensor  (21h)   Sensor 2 = high
Data2    time    (FFh)   overflow
         Sensor  (10h)   Sensor 1 = low
Data3    time    (05h)   50msec
         Sensor  (20h)   Sensor 2 = low
```

FIG.3(d)

07h, 11h, 05h, 21h, FFh, 10h, 05h, 20h, ···

FIG.4(a)   07h, 20h, 07h, 31h, FFh, 30h, 01h, 31h, 02h, 30h,
01h, 31h, 01h, FFh, 00h, 54h, 01h, 30h, FFh, FEh, 00h, 54h, ···

FIG.4(b)
<data>
Data0   time    (07h)   70msec
        Sensor  (20h)   Sensor 2 = low
Data1   time    (07h)   70msec
        Sensor  (31h)   Sensor 3 = high
Data2   time    (FFh)   overflow
        Sensor  (30h)   Sensor 3 = low
Data3   time    (01h)   10msec
        Sensor  (31h)   Sensor 3 = high
Data4   time    (02h)   20msec
        Sensor  (30h)   Sensor 3 = low
Data5   time    (01h)   10msec
        Sensor  (31h)   Sensor 3 = high
Data6   time    (01h)   10msec
        Sensor  (FFh)   error set
        time    (00h)
        Sensor  (54h)   JAM
Data7   time    (01h)   10msec
        Sensor  (30h)   Sensor 3 = low
Data8   time    (FFh)   overflow
        Sensor  (FEh)   error clear
        time    (00h)
        Sensor  (54h)   JAM

FIG.4(c)

FIG.5(a) 07h, 31h, FFh, 12h, 00h, 40h, 01h, 12h, 05h, FFh, 00h, 54h, FFh, FEh, 00h, 54h, · · ·

FIG.5(b)
<data>
Data0   time   (07h)   70msec
        Sensor (31h)   Sensor 3 = high
Data1   time   (FFh)   overflow
        Sensor (12h)   12 = cover open
Data2   time   (00h)
        motor  (40h)   motor = low
Data3   time   (01h)   10msec
        Sensor (12h)   12 = cover close
Data4   time   (05h)   50msec
        Sensor (FFh)   error set
        time   (00h)
        Sensor (54h)   JAM
Data5   time   (FFh)   overflow
        Sensor (FEh)   error clear
        time   (00h)
        Sensor (54h)   JAM

FIG.5(c)

IMAGE-FORMING DEVICE

BACKGROUND OF THE INVENTION

1. Field of the Invention

The present invention relates to an image-forming device such as a printer.

2. Description of Related Art

Image-forming devices such as printers are normally provided with a plurality of paper sensors disposed at prescribed intervals along the path in which the paper is conveyed. Each paper sensor includes an actuator that inclines in the conveying direction of the paper.

When contacted by a sheet of paper, the actuator leans over, triggering an ON state. After the paper passes over the actuator, the actuator returns to an upright position, triggering an OFF state. When a paper jam occurs, for example, the CPU in the image-forming device detects the ON/OFF state of each paper sensor and identifies the paper sensor that has detected the jam. Hence, the operator can determine in what section of the image-forming device that the paper jam has occurred based on the layout of the paper sensors.

Further, the image-forming device can record and print the time at which the error has been generated, as proposed in Japanese unexamined patent application publication No. 2000-127572, for example.

SUMMARY OF THE INVENTION

While the operator can learn the section of the printer in which the jam has occurred with this type of printer, this information alone is insufficient for resolving the problem that has caused the paper jam to occur. Even if the printer records the time of the paper jam occurrence, determining the cause of the paper jam from the time of occurrence may not be easy.

In view of the above-described drawbacks, it is an object of the present invention to provide an improved image-forming device that is capable of easily resolving the cause of an error occurrence.

In order to attain the above and other objects, the present invention provides an image-forming device comprising: an image forming portion forming images on an image recording medium; a signal-generating portion generating a status-indicating signal indicative of a status of the image forming portion; a storage portion storing data of the status-indicating signal; and a storage control portion storing, in the storage portion, data of the status-indicating signal in association with time series data indicative of a series of time.

According to another aspect, the present invention provides an image-forming device comprising: an image forming portion forming images on an image recording medium; a signal-generating portion generating a status-indicating signal indicative of a status of the image forming portion; a storage portion storing data of the status-indicating signal; and a storage control portion that stores, in the storage portion, data of the status-indicating signal in the form of a series of data in association with a series of time.

According to still another aspect, the present invention provides an image-forming device comprising: a housing; an image forming portion mounted in the housing and forming images on an image recording medium; a sensor disposed in the housing and detecting a status of the image forming portion and generating a detection signal; a storage portion storing data of the detection signal; and a storage control portion storing, in the storage portion, data of the detection signal in association with time data indicative of a series of time.

BRIEF DESCRIPTION OF THE DRAWINGS

The above and other objects, features and advantages of the invention will become more apparent from reading the following description of the preferred embodiments taken in connection with the accompanying drawings in which:

FIGS. 4(a)–4(c) show a second example, in which an error occurs due to a discharge sensor being bounced, wherein FIGS. 5(a)–5(c) show a third example, in which an error occurs due to opening of a cover, wherein

DETAILED DESCRIPTION OF THE PREFERRED EMBODIMENT

An image-forming device according to a preferred embodiment of the present invention will be described while referring to the accompanying drawings wherein like parts and components are designated by the same reference numerals to avoid duplicating description.

Figure 1:
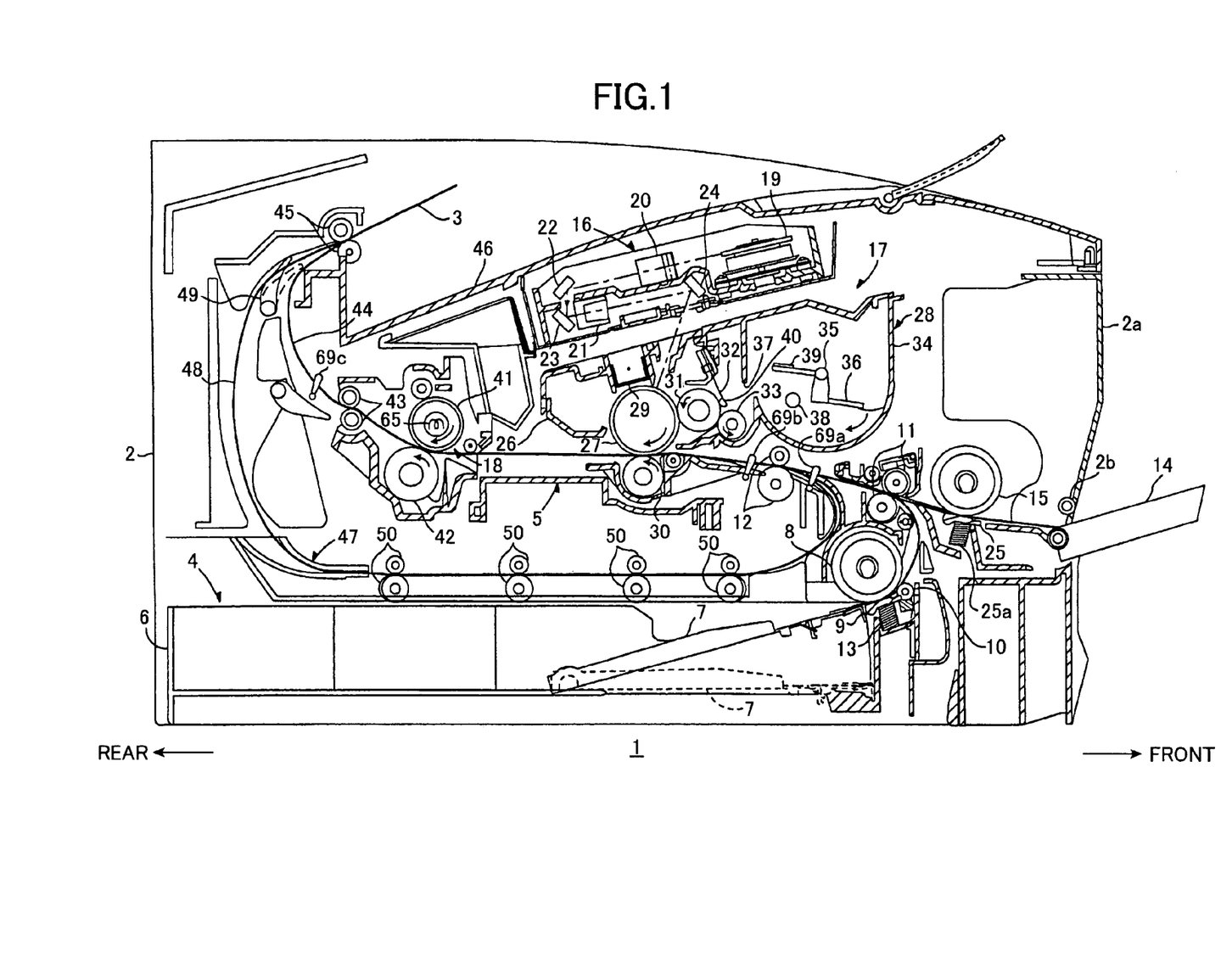
FIG. 1 is a side cross-sectional view showing the construction of a laser printer according to a preferred embodiment of the present invention.
Figure 2:
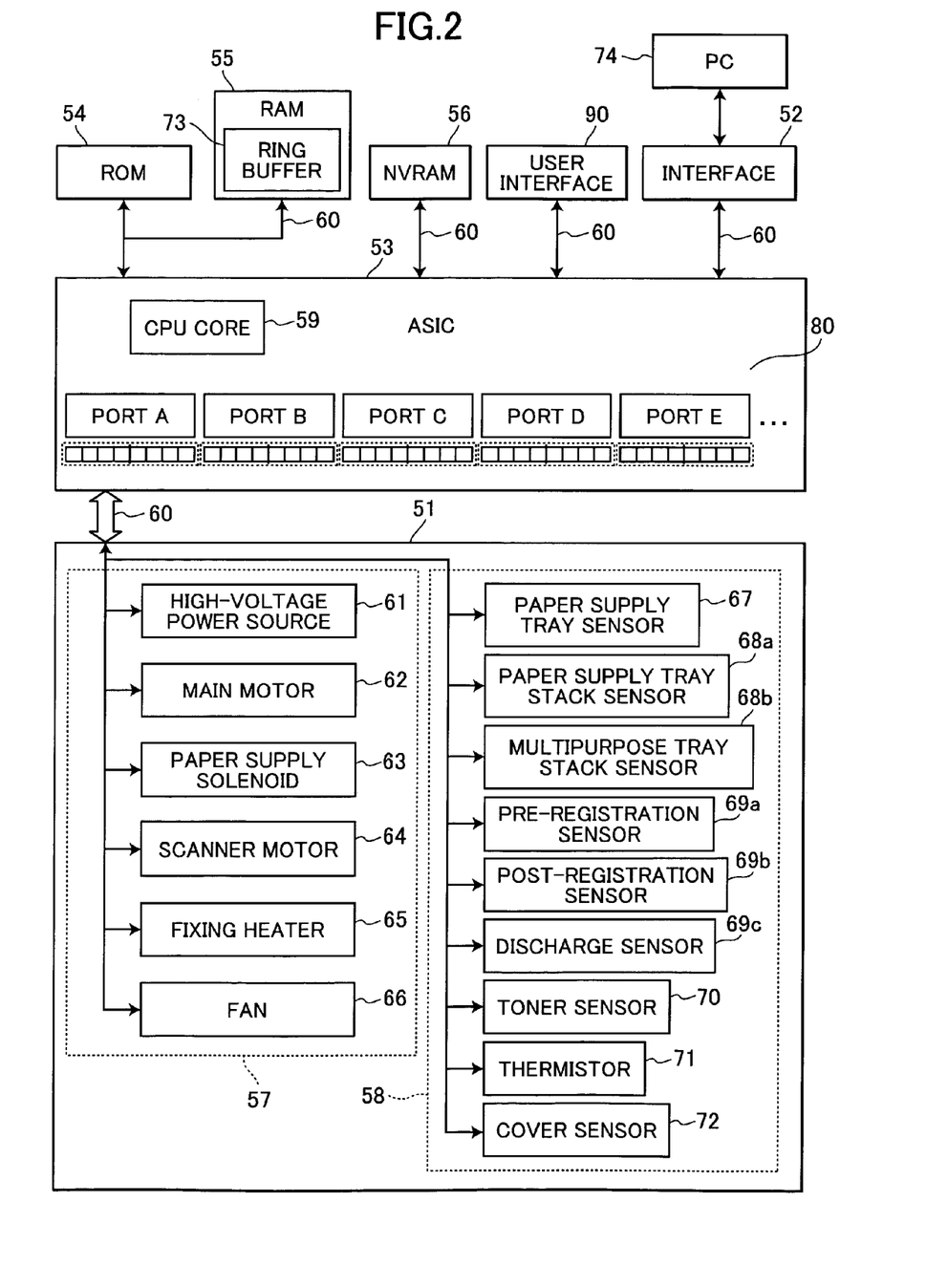
FIG. 2 is a block diagram showing the electrical construction of the laser printer in FIG. 1.

A laser printer according to an embodiment of the present invention will be described with reference to (FIGS. 1 and 2).

As shown in FIG. 1, the laser printer 1 includes a main casing 2, a feeder unit 4, and an image forming unit 5. The feeder unit 4 and the image forming unit 5 are Housed in the main casing 2. The feeder unit 4 supplies sheets 3 to the image forming unit 5. The image forming unit 5 forms desired images on the supplied sheets 3.

As shown in FIG. 2, an ASIC (application-specific integrated circuit) 53, a high-voltage power source 61, and a main motor 62 are provided in the laser printer 1. The ASIC 53 includes a CPU core 59 and a plurality of ports 80 (port A, port B, . . . ). The high-voltage power source 61 is for supplying electric power to various components provided in the laser printer 1. The main motor 62 is for generating power (motive power) based on the electric power supplied from the high-voltage power source 61.

The CPU core 59 controls the high-voltage power source 61 by supplying the high-voltage power source 61 with an electrical operation signal (On/Off operation signal). When the high-voltage power source 61 is turned on according to the On operation signal, the high-voltage power source 61 supplies electric power to the various components in the laser printer 1, enabling the laser printer 1 to execute its printing operation. When the high-voltage power source 61 is turned off according to the Off operation signal, the high-voltage power source 61 stops supplying electric power to the various components, thereby stopping the printing operation. It is noted that the CPU core 59 outputs the On/Off operation signal to a port 80 that corresponds to the high voltage power source 61.

The CPU core 59 controls the main motor 62 by supplying the main motor 62 with another electrical operation signal (On/Off operation signal). When the main motor 62 is turned on according to the On operation signal, the main motor 62 supplies motive power to the various components in the laser printer 1, enabling the laser printer 1 to execute its printing operation. When the main motor 62 is turned off according to the Off operation signal, the main motor 62 stops supplying motive power to the various components, thereby stopping the printing operation. It is noted that the CPU core 59 outputs the On/Off operation signal to another port 80 that corresponds to the main motor 62.

The feeder unit 4 includes a paper supply tray 6, a paper pressing plate 7, a sheet supply roller 8, a separating pad 9, paper dust removing rollers 10 and 11, and registration rollers 12. The paper pressing plate 7 is disposed inside the paper supply tray 6. The sheet supply roller 8 and the separating pad 9 are disposed above one end of the paper supply tray 6. The paper dust removing roller 10 and paper dust removing rollers 11 are disposed downstream of the sheet supply roller 8 in the conveying direction of the paper 3. The registration rollers 12 are disposed downstream of the paper dust removing roller 10 and the paper dust removing rollers 11 in the conveying direction of the paper 3. Hereafter, the side of the laser printer 1 in which the sheet supply roller 8 is provided (the right side in FIG. 1) will be referred to as the front side, while the side in which the fixing section 18 described later is provided (the left side in FIG. 1) will be referred to as the rear side.

The paper supply tray 6 is formed in an open-top box-shape and is disposed in the bottom section of the main casing 2. The paper supply tray 6 is detachably mounted in the main casing 2 via the front side of the laser printer 1.

A paper supply tray sensor 67 (see FIG. 2) is provided in the main casing 2. The paper supply tray sensor 67 detects whether or not the paper supply tray 6 is being presently mounted in the main casing 2, and outputs On/Off detection signals to a corresponding port 80 in the ASIC 53. The On detection signal indicates that the paper supply tray 6 is being presently mounted in the main casing 2, while the off detection signal indicates that the paper supply tray 6 is not being presently mounted in the main casing 2.

The sheet pressing plate 7 is capable of supporting a stack of sheets 3. The sheet pressing plate 7 is pivotably supported at its end furthest from the sheet supply roller 8 so that the end of the sheet pressing plate 7 that is nearest the sheet supply roller 8 can move vertically. Although not shown in the drawings, a spring for urging the sheet pressing plate 7 upward is provided to the rear surface of the sheet pressing plate 7. Therefore, the sheet pressing plate 7 pivots downward in accordance with increase in the amount of sheets 3 stacked on the sheet pressing plate 7. At this time, the sheet pressing plate 7 pivots around the end of the sheet pressing plate 7 farthest from the sheet supply roller 8, downward against the urging force of the spring. The sheet supply roller 8 and the sheet supply pad 9 are disposed in confrontation with each other. A spring 13 is provided beneath the sheet supply pad 9 for pressing the sheet supply pad 9 toward the sheet supply roller 8. Urging force of the spring under the sheet pressing plate 7 presses the uppermost sheet 3 on the sheet pressing plate 7 toward the sheet supply roller 8. The uppermost sheet 3 is sandwiched between the sheet supply roller 8 and the separation pad 13. Thereafter, a paper supply solenoid 63 (FIG. 2) is excited. The excited paper supply solenoid 63 transmits the power from the main motor 62 to the sheet supply roller 8. As a result, the sheet supply roller 8 rotates, thereby supplying one sheet 3 at a time. In this way, one sheet 3 at a time is separated from the stack and supplied to the paper dust removing rollers 10, 11.

The CPU core 59 (FIG. 2) controls the paper supply solenoid 63 by supplying the paper supply solenoid 63 with an electrical operation signal (On/Off operation signal). When the paper supply solenoid 63 is turned on according to the On operation signal, the paper supply solenoid 63 supplies power of the main motor 62 to the sheet supply roller 8, as a result of which the sheet supply roller 8 rotates and feeds a sheet of paper 3. When the paper supply solenoid 63 is turned off according to the Off operation signal, the paper supply solenoid 63 stops supplying power of the main motor 62 to the sheet supply roller 8, whereupon the sheet supply roller 8 stops rotating and stops feeding a sheet of paper 3. It is noted that the CPU core 59 outputs the On/Off operation signal to a port 80 in the ASIC 53 that corresponds to the paper supply solenoid 63.

A paper supply tray stack sensor 68a (see FIG. 2) is provided in the main casing 2 at the end of the paper pressing plate 7 nearest the sheet supply roller 8. The paper supply tray stack sensor 68a detects whether or not any sheets of paper 3 are stacked on the paper pressing plate 7, and outputs a detection signal (on/off signal indicative of the detected results) to a corresponding port 80 in the ASIC 53. The ON detection signal is indicative of that some sheets are stacked on the paper pressing plate 7. The Off detection signal is indicative of that no sheet is stacked on the paper pressing plate 7.

The paper dust removing rollers 10, 11 remove paper dust from the supplied sheet 3 and further convey them to the registration rollers 12. Being supplied with power from the main motor 62 (FIG. 2), the pair of registration rollers 12 perform a desired registration operation on the supplied sheet 3, and transport the sheet 3 to an image formation position. In the image formation position a photosensitive drum 27 and a transfer roller 30 contact each other. In other words, the image formation position is the transfer position where the visible toner image is transferred from the surface of the photosensitive drum 27 to a sheet 3 as the sheet 3 passes between the photosensitive drum 27 and the transfer roller 30.

A pre-registration sensor 69a and a post-registration sensor 69b are provided in the upstream side and downstream side of the registration rollers 12 in the sheet conveying direction. The pre-registration sensor 69a and post-registration sensor 69b detect the condition of transmission of the sheet 3 (recoding medium).

Each of the pre-registration sensor 69a and the post-registration sensor 69b includes a swingable actuator. When the paper 3 is conveyed along the paper-conveying path from an upstream side of each sensor 69a or 69b, the leading edge of the paper 3 contacts its actuator, causing the actuator to lean over and turn ON. When the trailing edge of the paper 3 separates from the actuator, the actuator returns to an upright position (shown in FIG. 1), turning OFF.

The pre-registration sensor 69a outputs its ON/OFF detection signal to a corresponding port 80 in the ASIC 53 (see FIG. 2). in this example, the pre-registration sensor 69a is connected, as Sensor 1, to the corresponding port 80. The post-registration sensor 69b outputs its ON/OFF detection signal to a corresponding port 80 in the ASIC 53 (see FIG. 2). In this example, the post-registration sensor 69b is connected, as Sensor 2, to the corresponding port 80. Accordingly, the operator can monitor the conveying state of the paper 3 that is being conveyed in the laser printer 1 and be notified of errors caused when the paper 3 jams, based on the ON/OFF status of the actuators in the pre-registration sensor 69a and post-registration sensor 69b.

The feeder unit 4 further includes a multipurpose sheet supply mechanism. The multipurpose sheet supply mechanism includes: a multipurpose tray 14, a multipurpose sheet supply roller 15, and a multipurpose sheet supply pad 25. The multipurpose sheet supply roller 15 and the multipurpose sheet supply pad 25 are disposed in confrontation with each other and are for supplying sheets 3 that are stacked on the multipurpose tray 14. A spring 25a provided beneath the multipurpose sheet supply pad 25 presses the multipurpose sheet supply pad 25 up toward the multipurpose sheet supply roller 15. Rotation of the multipurpose sheet supply roller 15 moves sheets 3 one at a time from the stack on the multipurpose tray 14 to a position between the multipurpose sheet supply pad 25 and the multipurpose sheet supply roller 15 so that the sheets 3 on the multipurpose tray 14 can be supplied one at a time to the image formation position.

A multipurpose tray stack sensor 68b (FIG. 2) is provided in the multipurpose sheet supply mechanism and detects whether or not any sheets 3 are stacked on the multipurpose tray 14. The multipurpose tray stack sensor 68b outputs an On/Off detection signal to a corresponding port 80 in the ASIC 53. The On detection signal is indicative of that some sheets are stacked on the multipurpose tray 14. The Off detection signal is indicative of that no sheet is stacked on the multipurpose tray 14.

The image forming section 5 includes a scanner section 16, a process unit 17, and the fixing section 18. The scanner section 16 is provided at the upper section of the casing 2 and is provided with a laser emitting section (not shown), a polygon mirror 19, lenses 20, 21, and reflection mirrors 22, 23, 24. The laser emitting section emits a laser beam based on desired image data. The polygon mirror 19 is driven by a scanner motor 64 (FIG. 2) to rotate. As indicated by single-dot chain line in FIG. 1, the laser beam passes through or is reflected by the mirror 19, the lens 20, the reflection mirrors 22 and 23, the lens 21, and the reflection mirror 24 in this order so as to irradiate, in a high speed scanning operation, the surface of the photosensitive drum 27 of the process unit 17.

Thus, the polygon mirror 19 is driven to rotate by the scanner motor 64 (FIG. 2). The CPU core 59 (FIG. 2) controls the scanner motor 64 (FIG. 2) by supplying the scanner motor 64 with an electrical operation signal (On/Off operation signal). When the scanner motor 64 is turned on according to the On operation signal, the scanner motor 64 rotates the polygon mirror 19, thereby scanning the laser beam onto the photosensitive drum 27. When the scanner motor 64 is turned off according to the Off operation signal, the scanner motor 64 stops rotating the polygon mirror 19, thereby stopping laser scanning operation. It is noted that the CPU core 59 outputs the On/Off operation signal to a port 80 in the ASIC 53 that corresponds to the scanner motor 64.

The process unit 17 is disposed below the scanner section 16. The process unit 17 includes a drum cartridge 26 and a development cartridge 28. The drum cartridge 26 can be detached from the main casing 2 and houses the photosensitive drum 27, a scorotron charge unit 29, and a transfer roller 30. The drum cartridge 26 can be detached from the main casing 2 by opening a front cover 2a, which is provided to the main casing 2.

The front cover 2a is provided on the front surface of the main casing 2. The front cover 2a is rotatably supported on the main casing 2 by a hinge 2b provided on the bottom edge of the front cover 2a. The front cover 2a is opened and closed in relation to the main casing 2 by swinging the top edge of the front cover 2a forward and rearward.

A cover sensor 72 (see FIG. 2) is disposed near the front cover 2a. The cover sensor 72 detects the open and closed status of the front cover 2a. More specifically, the cover sensor 72 turns ON when the front cover 2a is opened. The cover sensor 72 turns OFF when the front cover 2a is closed.

The cover sensor 72 outputs its ON/OFF detection signal to a corresponding port 80 in the ASIC 53 (see FIG. 2). In this example, the cover sensor 72 is connected, as Sensor 12, to the corresponding port 80. Accordingly, the operator can monitor whether the front cover 2a is opened or closed based on the ON/OFF detection signal from the cover sensor 72.

The CPU core 59 halts operations of the operating members 57 (see FIG. 2) to be described later when the CPU core 59 receives an ON detection signal from the cover sensor 72. For example, when the cover sensor 72 detects that the front cover 2a is opened during a printing process and issues an ON detection signal to the CPU core 59, the CPU core 59 halts the operation of the high-voltage power source 61 by outputting an OFF operation signal to the high-voltage power source 61 and halts operation of the main motor 62 by outputting an OFF operation signal to the main motor 62. In this way, the laser printer 1 can ensure the safety of the operator.

The development cartridge 28 is detachable from the drum cartridge 26 and is provided with a developing roller 31, a layer thickness regulating blade 32, a supply roller 33 and a toner hopper 34.

The toner hopper 34 is filled with positively charging, non-magnetic, single-component toner. In the present embodiment, polymerization toner is used as the toner. Polymerization toner has substantially spherical particles and so has an excellent fluidity characteristic. To produce polymerization toner, a polymerizing monomer is subjected to well-known copolymerizing processes, such as suspension polymerization. Examples of a polymerizing monomer include a styrene type monomer and an acrylic type monomer. An example of a styrene type monomer is styrene. Examples of acrylic type monomers are acrylic acid, alkyl (C1–C4) acrylate, and alkyl (C1–C4) metaacrylate. Because the polymerization toner has such an excellent fluidity characteristic, image development is reliably performed so that high-quality images can be formed.

Materials such as wax and a coloring agent are distributed in the toner. The coloring agent can be carbon black, for example. In addition, external additive, such as silica, are added in the toner to further improve the fluidity characteristic. The toner has a particle diameter of about 6–10 µm.

A rotation shaft 35 is disposed in the center of the toner hopper 34. An agitator 36 is supported on the rotation shaft 35. The agitator 36 rotates in the clockwise direction by the power supplied from the main motor 62 (FIG. 2). The agitator 36 agitates the toner in the toner hopper 34 and discharges the toner through a toner supply opening 37 that is opened through the side wall of the toner hopper 34.

A window 38 for detecting remaining toner is provided in each of two opposing end walls of the toner hopper 34. A cleaner 39 for cleaning the windows 38 is supported on the rotation shaft 35.

A toner sensor 70 (see FIG. 2) includes a light-emitting device (not shown) and a light-receiving device (not shown) that are disposed one on either side of the toner hopper 34 and confront each other via the windows 38. The toner sensor 70 detects whether the toner hopper 34 is out of toner, and outputs an ON/OFF detection signal indicative of whether the toner hopper 34 is empty to a corresponding port 80 in the ASIC 53. The ON detection signal indicates that the toner hopper 34 is empty. The OFF detection signal indicates that the toner hopper 34 is not empty.

The supply roller 33 is located on the side of the toner supply opening 37. The developing roller 31 is located confronting the supply roller 33. The supply roller 33 and the developing roller 31 are rotatable in the counterclockwise direction. The supply roller 33 and the developing roller 31 are disposed in abutment contact with each other so that both are compressed to a certain extent.

The supply roller 33 includes a metal roller shaft covered with a roller formed from an electrically conductive sponge material. The supply roller 33 rotates in the counterclockwise direction by the power supplied from the main motor 62.

The developer roller 31 includes a metal roller shaft and a roller portion covered thereon. The roller portion is made from a resilient member formed from a conductive rubber material. In more specific terms, the roller portion of the developing roller 31 is made from conductive silicone rubber or urethane rubber including, for example, carbon particles. The surface of the roller portion is covered with a coating layer of silicone rubber or urethane rubber that contains fluorine. The high-voltage power source 61 (FIG. 2) applies the developing roller 31 with a predetermined developing bias with respect to the photosensitive drum 27. The developing roller 31 rotates in the counterclockwise direction according to the power supplied from the main motor 62 (FIG. 2).

The layer thickness regulating blade 32 is disposed near the developing roller 31. The layer thickness regulating blade 32 includes a blade made from a metal leaf spring, and has a pressing member 40, that is provided on a free end of the blade. The pressing member 40 has a semi-circular shape when viewed in cross section. The pressing member 40 is formed from silicone rubber with electrically insulating properties. The layer thickness regulating blade 32 is supported by the developing cartridge 28 at a location near the developing roller 31. The resilient force of the blade presses the pressing member 40 against the surface of the developing roller 31.

The rotation of the supply roller 33 supplies the developing roller 31 with toner that has been discharged through the toner supply opening 37. At this time, the toner is triboelectrically charged to a positive charge between the supply roller 33 and the developing roller 31. Then, as the developing roller 31 rotates, the toner supplied onto the developing roller 31 moves between the developing roller 31 and the pressing member 40 of the layer thickness regulating blade 32. This reduces thickness of the toner on the surface of the developing roller 31 down to a thin layer of uniform thickness.

The photosensitive drum 27 is disposed to the side of and in confrontation with the developing roller 31. The photosensitive drum 27 is rotatable in the clockwise direction. The photosensitive drum 27 includes a drum-shaped member and a surface layer. The drum-shaped member is connected to ground. The surface layer is formed on the drum-shaped member from a photosensitive layer that is made from polycarbonate and that has a positively charging nature. The photosensitive drum 27 rotates in the clockwise direction according to the power supplied from the main motor 62.

The scorotoron charge unit 29 is disposed above the photosensitive drum 27 and is spaced away from the photosensitive drum 27 by a predetermined space so as to avoid direct contact with the photosensitive drum 27. The scorotron charge unit 29 is a positive-charge scorotron type charge unit for generating a corona discharge from a charge wire made from, for example, tungsten. The scorotoron charge unit 29 is applied with a charging voltage from the high-voltage power source 61 (FIG. 2) to form a blanket of positive-polarity charge on the surface of the photosensitive drum 27.

The transfer roller 30 is rotatably supported in the drum cartridge 26 at a position below and in confrontation with the photosensitive drum 27. The transfer roller 30 is rotatable in the counterclockwise direction. The transfer roller 30 includes a metal roller shaft and a roller portion covering the shaft and made from electrically-conductive rubber material. At times of toner image transfer, the high-voltage power source 61 applies the transfer roller 30 with a predetermined transfer bias with respect to the photosensitive drum 27. The transfer roller 30 rotates in the counterclockwise direction according to the power supplied from the main motor 62.

As the photosensitive drum 27 rotates, the scorotoron charge unit 29 first forms a blanket of positive charge on the surface of the photosensitive drum 27, and then the surface of the photosensitive drum 27 is exposed to high speed scan of the laser beam from the scanner section 16. The electric potential of the positively charged surface of the photosensitive drum 27 drops at positions exposed to the laser beam. As a result, an electrostatic latent image is formed on the photosensitive drum 27 based on desired image data used to drive the laser beam. Next, an inverse developing process is performed. That is, as the developing roller 31 rotates, the positively-charged toner borne on the surface of the developing roller 31 is brought into contact with the photosensitive drum 27. Because of the developing bias voltage applied to the developing roller 31, the toner on the developing roller 31 is supplied to lower-potential areas of the electrostatic latent image on the photosensitive drum 27. As a result, the toner is selectively borne on the photosensitive drum 27 so that the electrostatic latent image is developed into a visible toner image.

Thereafter, the visible toner image borne on the surface of the photosensitive drum 27 is transferred to a sheet 3 according to the transfer bias applied to the transfer roller 30 as the sheet 3 passes between the photosensitive drum 27 and the transfer roller 30.

The fixing section 18 is disposed to the side of the process unit 17 and downstream of the same in the conveying direction of the paper 3. The fixing section 18 includes a heating roller 41, a pressure roller 42 applying pressure to the heating roller 41, and a pair of transport rollers 43. The transport rollers 43 are disposed downstream of the heating roller 41 and the pressure roller 42. The heating roller 41 is formed of metal in a cylindrical shape and accommodates a fixing heater 65 (see FIG. 2) including a halogen lamp. The fixing heater 65 heats the heating roller 41. A fan 66 (see FIG. 2) is provided in the fixing section 18 to decrease the temperature of the surface of the heating roller 41.

A thermistor 71 (see FIG. 2) is provided to detect the surface temperature of the heating roller 41. The thermistor 71 is disposed in contact with the surface of the heating roller 41. The CPU core 59 controls the ON/OFF state of the fixing heater 65 and the ON/OFF state of the fan 66 (see FIG. 2) based on the temperature detected by the thermistor 71. More specifically, the CPU core 59 generates an electrical operation signal (On/Off signal) for the fixing heater 65 and an electrical operation signal (On/Off signal) for the fan 66 dependently on the detected temperature. The CPU core 59 supplies the On/Off signals to the fixing heater 65 and to the fan 66. Hence, by turning on and off the fixing heater 65 according to the On/Off signal and by turning on and off the fan 66 according to the On/Off signal, the surface temperature of the heating roller 41 is maintained at a predetermined fixing temperature. Further, the main motor 62 (see FIG. 2) drives the heating roller 41 to rotate in the clockwise direction indicated by the arrow in FIG. 1. It is noted that the CPU core 59 outputs the On/Off operation signal for the fixing heater 65 to a port 80 in the ASIC 53 that corresponds to the fixing heater 65 and that the CPU core 59 outputs the On/Off operation signal for the fan 66 to another port 80 that corresponds to the fan 66.

The pressure roller 42 presses against the heating roller 41 and rotates in the counterclockwise direction indicated by the arrow in FIG. 1 in cooperation with the heating roller 41.

In this way, the process unit 17 transfers toner onto the paper 3. The heating roller 41 and pressure roller 42 subsequently fix the toner onto the paper 3 by heat as the paper 3 passes therebetween. The transport rollers 43 convey the paper 3 onto a sheet-discharge path 44. Sheet-discharge rollers 45 discharge the paper 3 onto a sheet-discharge tray 46.

A discharge sensor 69c is provided on the sheet-discharge path 44 at a position downstream side of the transport rollers 43 and near to the transport rollers 43. The discharge sensor 69c includes a swingable actuator similarly to the pre-registration sensor 69a and post-registration sensor 69b. That is, when the paper 3 is conveyed along the sheet-discharge path 44 from an upstream side of the sensor 69c, the leading edge of the paper 3 contacts its actuator, causing the actuator to lean over and turn ON. When the trailing edge of the paper 3 separates from the actuator, the actuator returns to an upright position (shown in FIG. 1), turning OFF. The discharge sensor 69c outputs its ON/OFF detection signal to a corresponding port 80 in the ASIC 53. In this example, the discharge sensor 69c is connected, as Sensor 3, to the corresponding port 80. Hence, the operator can monitor the status of the paper 3 conveyed to the sheet-discharge rollers 45 and be notified of errors caused by the paper 3 jamming, based on the ON/OFF status of the actuator detected by the discharge sensor 69c.

The laser printer 1 is further provided with an inverting transport unit 47 for inverting sheets 3 that have been printed on once and for returning the sheets 3 to the image forming unit 5 so that images can be formed on both sides of the sheets 3. The inverting transport unit 47 includes the sheet-discharge rollers 45, an inversion transport path 48, a flapper 49, and a plurality of inversion transport rollers 50.

The sheet-discharge rollers 45 are a pair of rollers that can be rotated selectively forward or in reverse. The sheet-discharge rollers 45 are rotated forward to discharge sheets 3 onto the sheet-discharge tray 46 and rotated in reverse when sheets are to be inverted.

The inversion transport rollers 50 are disposed below the image forming unit 5. The inversion transport path 48 extends vertically between the sheet-discharge rollers 45 and the inversion transport rollers 50. The upstream end of the inversion transport path 48 is located near the sheet-discharge rollers 45 and the downstream end is located near the inversion transport rollers 50 so that sheets 3 can be transported downward from the sheet-discharge rollers 45 to the inversion transport rollers 50.

The flapper 49 is swingably disposed at the junction between the sheet-discharge path 44 and the inversion transport path 48. By activating or deactivating a solenoid (not shown), the flapper 49 can be selectively swung between the orientation shown in broken line and the orientation shown by solid line in FIG. 1. The orientation shown in solid line in FIG. 1 is for transporting sheets 3 that have one side printed to the sheet-discharge rollers 45. The orientation shown in broken line in FIG. 1 is for transporting sheets from the sheet-discharge rollers 45 into the inversion transport path 48, rather than back into the sheet-discharge path 44.

The inversion transport rollers 50 are aligned horizontally at positions above the sheet supply tray 6. The pair of inversion transport rollers 50 that is farthest upstream is disposed near the rear end of the inversion transport path 48. The pair of inversion transport rollers 50 that is located farthest downstream is disposed below the registration rollers 12.

The inverting transport unit 47 operates in the following manner when a sheet 3 is to be formed with images on both sides. A sheet 3 that has been formed on one side with an image is transported by the transport rollers 43 from the sheet-discharge path 44 to the sheet-discharge rollers 45. The sheet-discharge rollers 45 rotate forward with the sheet 3 pinched therebetween until almost all of the sheet 3 is transported out from the laser printer 1 and over the sheet-discharge tray 46. The forward rotation of the sheet-discharge rollers 45 is stopped once the rear-side end of the sheet 3 is located between the sheet-discharge rollers 45. Then, the sheet-discharge rollers 45 are driven to rotate in reverse while at the same time the flapper 49 is switched to change transport direction of the sheet 3 toward the inversion transport path 48. As a result, the sheet 3 is transported into the inversion transport path 48. The flapper 49 reverts to its initial position once transport of the sheet 3 to the inversion transport path 48 is completed. That is, the flapper 49 switches back to the position for transporting sheets from the transport rollers 43 to the sheet-discharge rollers 45. Next, the inverted sheet 3 is transported through the inversion transport path 48 to the inversion transport rollers 50 and then upward from the inversion transport rollers 50 to the registration rollers 12. The registration rollers 12 align the front edge of the sheet 3. Afterward, the sheet 3 is transported toward the image formation position. At this time, the upper and lower surfaces of the sheet 3 are reversed from the first time that an image has been formed on the sheet 3 so that an image can be formed on the other side as well. In this way, images are formed on both sides of the sheet 3.

According to the present embodiment, the laser printer 1 can store, in a time series: detection signals issued from the sensors 58 (paper supply tray sensor 67, paper supply tray stack sensor 68a, multipurpose tray stack sensor 68b, pre-registration sensor 69a, post-registration sensor 69b, discharge sensor 69c, toner sensor 70, thermistor 71, and cover sensor 72); and operation signals issued from the CPU core 59 to the operating members 57 (high-voltage power source 61, main motor 62, paper supply solenoid 63, scanner motor 64, fixing heater 65, and fan 66). The laser printer 1 can output the stored data.

FIG. 2 is a block diagram showing the electrical construction of the laser printer 1.

S As shown in FIG. 2, the laser printer 1 includes: an engine 51, an interface 52, the ASIC 53, a ROM 54, a RAM 55, a NVRAM 56, and a user interface 90. The NVRAM 56 is a nonvolatile memory.

The engine 51 includes the mechanical components described above with reference to FIGS. 1 and 2 for executing the printing process. These mechanical components include: the various sensors 58 (paper supply tray sensor 67, paper supply tray stack sensor 68a, multipurpose tray stack sensor 68b, pre-registration sensor. 69a, post-registration sensor 69b, discharge sensor 69c, toner sensor 70, thermistor 71, and cover sensor 72) for detecting the status of the laser printer 1; and the various operating members 57 (high-voltage power source 61, main motor 62, paper supply solenoid 63, scanner motor 64, fixing heater 65, and fan 66) which are electrically driven in accordance with electric operation signals supplied from the CPU core 59 and based on electric power supplied from the high-voltage power source 61.

A personal computer 74 is connected to the interface 52 as an external device.

The user interface 90 is constructed from a display and a switch panel. An operator can input his/her desired instruction and/or selection into the laser printer 1 by manipulating the switch panel while viewing the display.

The ASIC 53 includes the CPU core 59 and the plurality of ports 80 (ports A, B, C, D, E, . . . ). The ASIC 53 is connected, via buses 60, to the ROM 54, the RAM 55, the NVRAM 56, the engine 51, the interface 52, and the user interface 90.

The CPU core 59 serves as the center of control in the laser printer 1, and controls each component in the laser printer 1.

Each of the plurality of operating members 57 (61, 62, 63, 64, 65, 66) and the plurality of sensors 58 (67, 68a, 68b, 69a, 69b, 69c, 70, 71, 72) is connected to a corresponding port 80 in the ASIC 53. An operation signal issued from the CPU core 59 to each operating member 57 is inputted to the corresponding port 80 in the ASIC 53. More specifically, the operation signal is supplied from the CPU core 59 to the corresponding operating member 57 via the corresponding port 80. A detection signal issued from each sensor 58 is inputted into the corresponding port 80. More specifically, the detection signal is supplied from each sensor 58 to the CPU core 59 via the corresponding port 80.

The RAM 55 is a memory for temporarily storing numerical values and other data. The RAM 55 include a ring buffer 73.

The ROM 54 stores therein various programs for controlling the laser printer 1. The programs include: a print control program, an error detection program, a storage control program, and an output program.

By executing the print control program, the CPU core 59 controls the mechanical components 57 and 58 to perform a printing process.

By executing the error detection program, the CPU core 59 determines whether an error has occurred and the error has been cleared in the laser printer 1 based on detection signals issued from the sensors 58. The CPU core 59 generates an error-indicating signal based on the determined results. The CPU core 59 turns the error-indicating signal ON when the CPU core 59 determines that an error has occurred. The CPU core 59 turns the error-indicating signal OFF when the CPU core 59 determines that an error has been cleared. The CPU core 59 inputs the error-indicating signal into a corresponding port 80 in the ASIC 53. In this example, the CPU core 59 is connected to the corresponding port 80 as Sensor 15 serving as a source of the error-indicating signal.

By executing the storage control program, the CPU core 59 stores, in the ring buffer 73, data of the detection signals inputted from the sensors 58 to the ports 80, data of the operation signals for the operating members 57 inputted from the CPU core 59 to the ports 80, and data of the error-indicating signal (data indicative of occurrence of errors and data indicative of clearance of errors) inputted from the CPU core 59 to the port 80. The CPU core 59 stores the data of detection signals when the detection signals change, stores the data of operation signals when the operation signals change, and stores the data of error occurrence/clearance when the error-indicating signal changes. Accordingly, the CPU core 59 stores, in the ring buffer 73, the data of detection signals, the data of operation signals, the data of error occurrence, and the data of error clearance in the form of a time series, that is, in an order when the detection signals change, when the operation signals change, when the error occurs, and when the error is cleared.

By executing the output program, the CPU core 59 outputs data of the detection signals, operation signals, error occurrence, and error clearance stored in the ring buffer 73.

The NVRAM 56 is a nonvolatile memory. Data stored in the NVRAM 56 will not be lost even when the laser printer 1 loses power or is reset.

Next, the storage control program will be described in greater detail. By executing the storage control program, the CPU core 59 writes, in the ring buffer 73, data of the detection signals issued from the sensors 58, data of the operation signals issued from the CPU core 59 to the operating members 57, and data of the error-indicating signals issued from the CPU core 59 (results of error detection, that is, error occurrence and error clearance) as a time series.

Figure 3A:
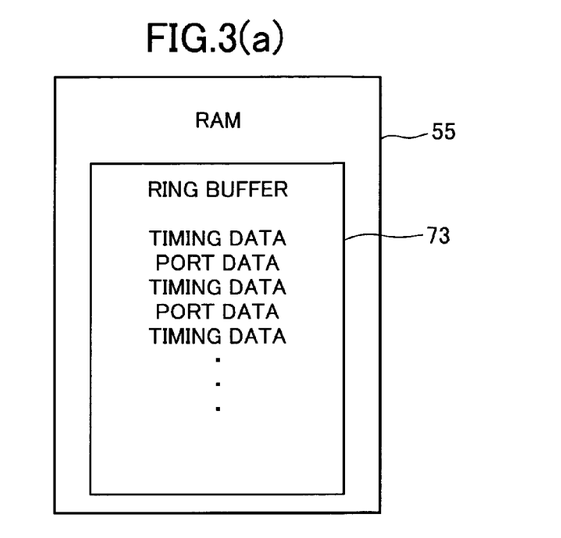
FIG. 3(a) is an explanatory diagram showing the structure of a RAM in the laser printer.

As shown in FIG. 3(a), the ring buffer 73 is set in the RAM 55 to have a predetermined storage capacity. For example, the ring buffer 73 is prepared in the RAM 55 to have a capacity of 1,024 bytes for storing data equivalent to printing four pages worth of A4-size paper during a normal printing operation. Data of the detection signals, operation signals, and the error-indicating signal is sequentially written to the ring buffer 73 according to the storage control program whenever the status of the data changes.

More specifically, by executing the storage control program, the CPU core 59 generates timing data and port data when some change occurs in the detection signals, the operation signals, and the error-indicating signals inputted to the ports 80. The ring buffer 73 is set to a capacity capable of storing timing data of one byte and port data of one byte.

Each of Changes in the detection signals and in the operation signals is indicated by two bytes of data, that is, one set of timing data and one set of port data. Timing data indicates the timing at which the change has occurred. Port data indicates what kind of change has occurred in which sensor 58 or operating member 57 at that timing.

Changes in the error-indicating signals, that is, the error detection results are indicated by four bytes of data including: one set of timing data, one set of port data indicative of error occurrence/clearance, one set of dummy timing data, and another set of port data indicative of type of error. The port data indicative of error occurrence is FFh, while the port data indicative of error clearance is FEh. The dummy timing data is 00 h. A unique number is assigned for each type of error. For example, the type of error data indicative of a paper jam error is "54"h.

Accordingly, data (timing data and port data) is stored in the ring buffer 73 only when changes occur in the detection signals from the sensors 58, in the operation signals outputted to the operating members 57, and in the error-indicating signal outputted from the CPU core 59, thereby storing only data necessary for analysis. As a result, it is possible to facilitate the analysis and reduce the amount of the required memory capacity.

The timing data is indicative of the length of time that has elapsed from the time when data (timing data and port data) has been written in the ring buffer 73 at the latest to the time when data (timing data and port data) is currently written in the ring buffer 73.

It is noted that in this example, the storage capacity prepared in the ring buffer 73 for each set of timing data is set to one byte that corresponds to 2.25 seconds. Hence, when 2.25 seconds or more elapses after the previous change has occurred, an overflow (FFh) is stored as timing data in the ring buffer 73. More specifically, a timer (not shown in the drawings) is provided in the ASIC 53 to measure the elapsed time. When the elapsed time reaches the prescribed time (2.25 seconds, in this example), the timer stops measuring time, and timing data "overflow" is written in the ring buffer 73. This further reduces the amount of the required memory capacity.

When power to the laser printer 1 is turned on, that is, when the high-voltage power source 61 is turned on, the CPU core 59 starts executing the storage control program. Timing data and port data are successively stored in the ring buffer 73 from the point in time that power to the laser printer 1 is turned on. When the entire storage area of the ring buffer 73 is filled with timing data and port data, newly-generated timing data and port data is written over timing data and port data that has been written the oldest among all the sets of timing data and port data that are presently stored in the ring buffer 73. As a result, the oldest data is deleted, and the new data is written in the ring buffer 73.

By executing the output program, the CPU core 59 outputs the timing data and port data stored in the ring buffer 73.

The output program includes a mode selection program enabling an operator to select his/her desired mode. By executing this mode selection program, the CPU core 59 prompts the operator to select either one of: an output enable mode for executing output; and an output disable mode for not executing output. More specifically, the CPU core 59 controls the display in the user interface 90 to display a mode-selection menu. The mode-selection menu shows indication of the output enable mode and the output disable mode. While viewing the mode-selection window, the operator manipulates the switch panel in the user interface 90 to select his/her desired one of the output enable mode and the output disable mode.

For the output enable mode, the operator further chooses settings in the output program for outputting the data in the ring buffer 73 to the personal computer 74 via the interface 52, for outputting the data to the NVRAM 56, or for printing out the data on the paper 3. More specifically, the mode selection program further enables the operator to select one of: a PC-output mode for outputting data in the ring buffer 73 to the PC 74; an NVRAM-output mode for outputting data in the ring buffer 73 to the NVRAM 56; and a print-output mode for outputting data in the ring buffer 73 onto a sheet of paper 3. According to the mode selection program, when the operator selects the output enable mode, the CPU core 59 prompts the operator to further select either one of the PC-output mode, NVRAM-output mode, and print-output mode, by controlling the display in the user interface 90 to display another mode-selection menu to indicate the PC-output mode, NVRAM-output mode, and print-output mode. The user manipulates the switch panel in the user interface 90 to select his/her desired mode from among these three modes.

By outputting timing data and port data stored in the ring buffer 73 to the personal computer 74 or by printing out this data on the paper 3, the operator can confirm detection signals from the sensors 58, operation signals outputted to the operating members 57, and occurrence and clearance of errors as a time series. Hence, the history leading up to the error occurrence can be clearly presented to the operator, enabling the operator to analyze the cause of the error in detail. By outputting timing data and port data stored in the ring buffer 73 to the NVRAM 56, the NVRAM 56 will store the data even when the power to the laser printer 1 is temporarily turned off. Therefore, the operator can later control the laser printer 1 to output the data to the personal computer 74 or on the paper 3 and analyze the cause of the error.

The mode selection program further enables the operator to select either one of a normal output mode and an automatic output mode. During the normal output mode, the CPU core 59 will start executing the output program when the operator manipulates the switch panel in the user interface 90 to input his/her instruction to output data in the ring buffer 73 during the output enable mode. During the automatic output mode, the CPU core 59 will automatically start executing the output program when an error is detected during the output enable mode or when a detected error is cleared during the output enable mode. After the operator selects the output enable mode and selects either one of the PC-output mode, NVRAM-output mode, and print-output mode, the CPU core 59 prompts the operator to further select either one of the normal output mode and the automatic output mode by controlling the display in the user interface 90 to show still another mode selection menu that indicates the normal output mode and the automatic output mode. The user can manipulate the switch panel in the user interface 90 to select either one of the normal output mode and the automatic output mode.

It is noted that instead of using the user interface 90 on the laser printer 1, the operator can perform his/her setting operation on the PC 74: to select one of the output enable mode and the output disable mode; to select one from among the PC-output mode, NVRAM-output mode, and print-output mode; and to select one of the normal output mode and the automatic output mode. Data of the operator's selection is inputted via the interface 52 into the laser printer 1.

Next will be described examples showing how timing data and port data is successively written in the ring buffer 73.

FIRST EXAMPLE

Figure 3B:
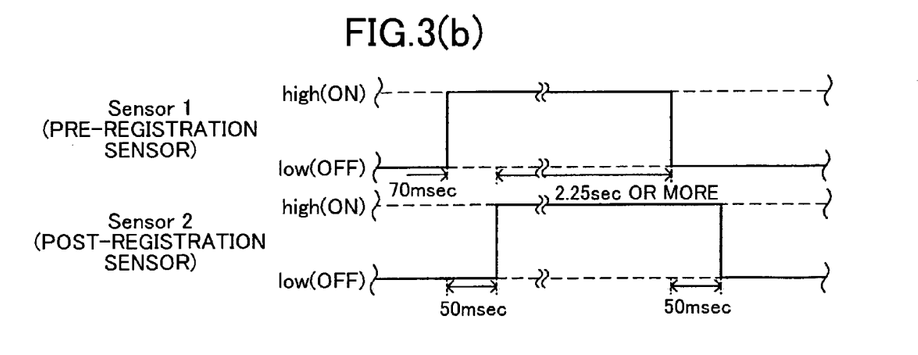
FIG. 3(b) is a timing diagram for sensors in a first example.
Figure 3C:
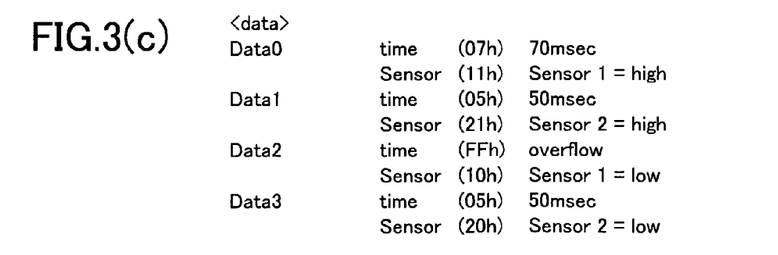
FIG. 3(c) is an analyzed result of data stored in a ring buffer of the RAM in the first example.
Figure 3D:
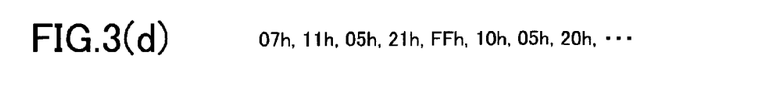
FIG. 3(d) indicates the data stored in the ring buffer in the first example.

It is now assumed that the paper 3 is being fed along the sheet feeding path. As shown in FIG. 3(b), the leading edge of the sheet 3 reaches the pre-registration sensor 69a 70 msec after some previous change has occurred, turning ON the pre-registration sensor 69a. The leading edge of the sheet 3 reaches the post-registration sensor 69b 50 msec after the pre-registration sensor 69a has turned ON, turning ON the post-registration sensor 69b. Next, as the result of the conveyance of the paper 3, the trailing edge of the sheet 3 separates from the pre-registration sensor 69a 2.25 seconds or more after the post-registration sensor 69b has turned ON, turning OFF the pre-registration sensor 69a. Next, the trailing edge of the sheet 3 separates from the post-registration sensor 69*b* 50 msec after the pre-registration sensor 69*a* has turned OFF, turning OFF the post-registration sensor 69*b*.

In this case, a series of data 07 h, 11 h, 05 h, 21 h, FFh, 10 h, 05 h, 20 h is stored in the ring buffer 73 in a time series as shown in FIG. 3(*d*).

An analysis of the data series of FIG. 3(*d*) reveals the following information: As shown in FIG. 3(*c*), 70 msec (07 h) is stored as timing data and Sensor 1 (pre-registration sensor 69*a*) high =(ON) (11 h) is stored as port data under Data 0. 50 msec (05 h) is stored as timing data and Sensor 2 (post-registration sensor 69*b*)=high (ON) (21 h) is stored as port data under Data 1. Overflow (FFh) is stored as timing data and Sensor 1 (pre-registration sensor 69*a*)=low (OFF) (10 h) is stored as port data under Data 2. 50 msec (05 h) is stored as timing data and Sensor 2 (post-registration sensor 69*b*)=low (OFF) (20 h) is stored as port data under Data 3. In this way, the series of data is divided into four sets of Data 0–3, each entry Data including timing data and port data.

SECOND EXAMPLE

Figure 4A:
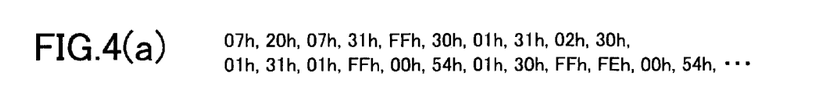
FIG. 4(a) is a list of data stored in the ring buffer of the RAM.
Figure 4B:
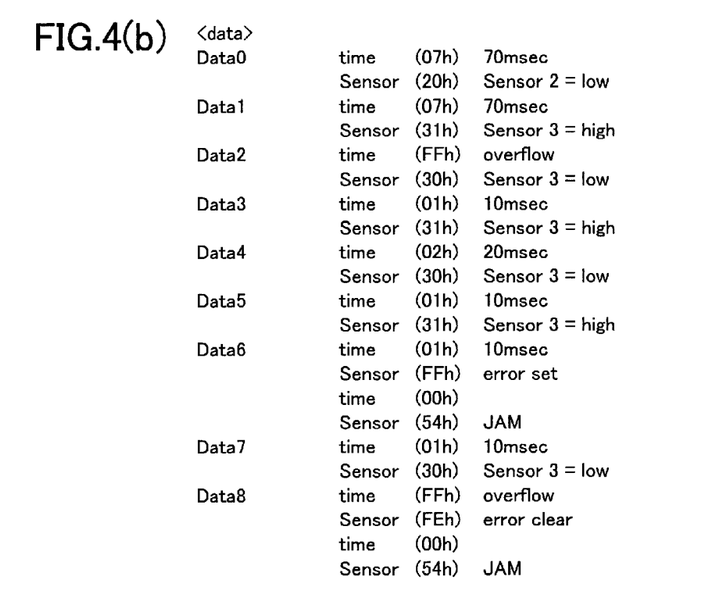
FIG. 4(b) is an analyzed result of the data of FIG. 4(a)
Figure 4C:
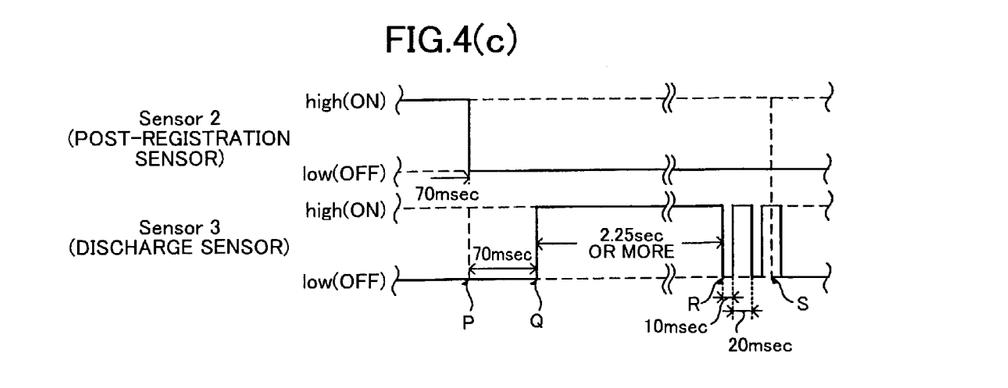
FIG. 4(c) is a timing diagram for sensors in the second example.

In this example, while the paper 3 is being conveyed, as shown in FIG. 4(*c*), the trailing edge of the paper 3 separates from the post-registration sensor 69*b*, causing the post-registration sensor 69*b* to turn OFF 70 msec after the previous change (timing P). After an image is formed at the image forming position, the leading edge of the paper 3 contacts the discharge sensor 69*c* 70 msec after the post-registration sensor 69*b* has turned OFF, turning the discharge sensor 69*c* ON (timing Q). After 2.25 seconds or more elapses, the trailing edge of the paper 3 separates from the discharge sensor 69*c*, and the discharge sensor 69*c* turns OFF (timing R). After another 10 msec, the discharge sensor 69*c* turns ON again and then turns OFF 20 msec later. After another 10 msec, the discharge sensor 69*c* again turns ON. An error is detected 10 msec later (timing S).

More specifically, the CPU core 59 detects the occurrence of error at timing S by executing the error detection program. The CPU core 59 determines that a paper jam error has occurred by knowing the fact that the discharge sensor 69*c* is in an ON state at timing S. It is noted that if the paper 3 is conveyed normally, after the trailing edge of the sheet 3 separates from the post-registration sensor 69*b* at timing P, the trailing edge of the sheet 3 separates from the discharge sensor 69*c* at timing R. Timing S is defined as such a timing that is a predetermined length of time after timing P, and that is after timing R. Because timing S is after timing R, it is known that if the paper 3 is properly conveyed after timing P, the trailing edge of the sheet 3 should have already separated from the discharge sensor 69*c* at timing S. The CPU core 59 therefore determines that a paper jam error has occurred if the discharge sensor 69*c* is in the ON state at timing S.

Next, the discharge sensor 69*c* turns OFF 10 msec after timing S. After 2.25 seconds or more elapses, the error is cleared, although not shown in the drawing.

In such a case, timing data and port data is written to the ring buffer 73 in the form of a series of data as shown in FIG. 4(*a*).

An analysis of this data series reveals the following information: As shown in FIG. 4(*b*), 70 msec (07 h) is stored as timing data and Sensor 2 (post-registration sensor 69*b*) =low (OFF) (20 h) is stored as port data under Data 0. Next, 70 msec (07 h) is stored as timing data and Sensor 3 (discharge sensor 69*c*)=high (ON) (31 h) is stored as port data under Data 1. Overflow (FFh) is stored as timing data and Sensor 3 (discharge sensor 69*c*)=low (OFF) (30 h) is stored as port data under Data 2. 10 msec (01 h) is stored as timing data and Sensor 3 (discharge sensor 69*c*)=high (ON) (31 h) is stored as port data under Data 3. 20 msec (02 h) is stored as timing data and Sensor 3 (discharge sensor 69*c*) =low (OFF) (30 h) is stored as port data under Data 4. 10 msec (01 h) is stored as timing data and Sensor 3 (discharge sensor 69*c*)=high (ON) (31 h) is stored as port data under Data 5. 10 msec (01 h) is stored as timing data and error set (FFh) is stored as port data under Data 6. In addition, 0 msec (00 h), indicating the same time as the error detection timing, is stored as dummy timing data and JAM (54 h), serving as the error type, is stored as port data under Data 6. Next, 10 msec (01 h) is stored as timing data and Sensor 3 (discharge sensor 69*c*)=low (OFF) (30 h) is stored as port data under Data 7. Overflow (FFh) is stored as timing data and error clear (FEh) is stored as port data under Data 8. In addition, 0 msec (00 h) is stored as dummy timing data and the error type JAM (54 h) is stored as port data under Data 8. This data indicates that the error is cleared 2.25 seconds or more after the timing in Data 7.

If the laser printer 1 is in the output enable mode, the laser printer 1 outputs data of FIG. 4(*a*) when the error occurs or when the error is cleared. That is, at the time of occurrence or clearance of error, the operator inputs his/her output instruction into the laser printer 1, upon which the laser printer 1 performs outputting operation. Alternatively, the laser printer 1 automatically outputs data in the ring buffer 73 when the error occurs or when the error is cleared. Analyzing the outputted results, the operator can construct the timing chart of FIG. 4(*c*). The operator knows the following stories: At the timing R, the discharge sensor 69*c* turns OFF. In other words, the actuator returns to its upright position because the trailing edge of the paper 3 separates normally from the discharge sensor 69*c*. After 10 msec, the actuator turns ON again and 20 msec later turns OFF. After another 10 msec the actuator turns ON again. Another 10 msec later the error is detected (timing S), and the actuator turns OFF after another 10 msec.

Based on this data, the operator knows that the detected error has caused not because the paper 3 has not passed over the discharge sensor 69*c*, but because the actuator in the discharge sensor 69*c* has bounced. The operator can take measures to prevent the actuator from bouncing, by employing a cushion or the like.

THIRD EXAMPLE

Figure 5A:
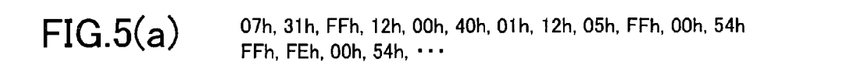
FIG. 5(a) is a list of data stored in the ring buffer of the RAM.
Figure 5B:
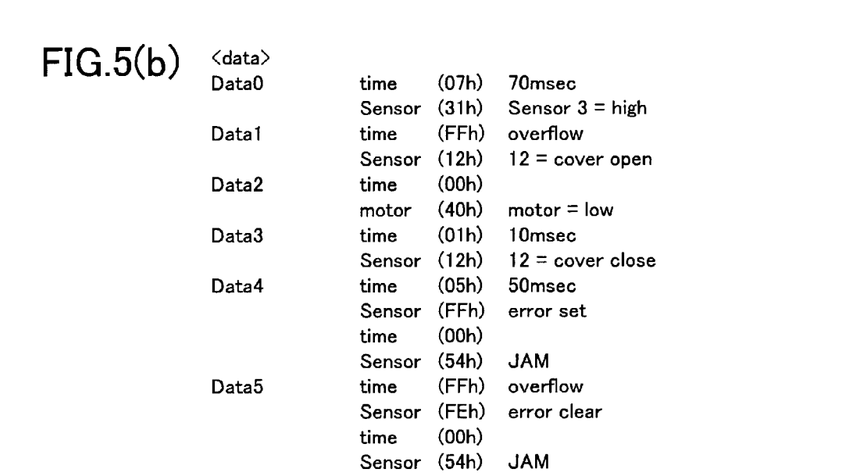
FIG. 5(b) is an analyzed result of the data of FIG. 5(a)

FIG. 5(*a*) shows the timing data and port data stored in the ring buffer 73 when another error is detected. FIG. 5(*b*) shows the information resulting from analyzing he data in FIG. 5(*a*).

Figure 5C:
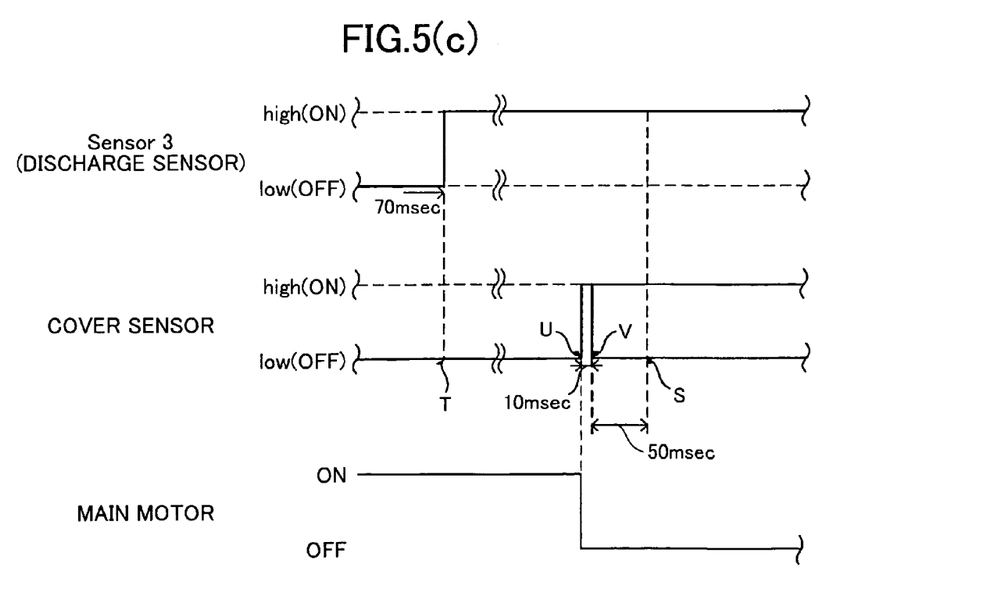
FIG. 5(c) is a timing diagram for sensors and motor in the second example.

Specifically, as shown in FIG. 5(*c*), while the paper 3 is being conveyed, the leading edge of the paper 3 contacts the discharge sensor 69*c* 70 msec after the previous change, turning the discharge sensor 69*c* ON (timing T). After 2.25 seconds or more has elapsed, the cover sensor 72 turns ON (timing U). At the same time, the main motor 62 is turned off in response to an OFF operation signal that is issued from the CPU core 59 in order to ensure safety of the operator. Another 10 msec later, the cover sensor 72 turns OFF (timing V). A paper jam error is detected 50 msec later (timing S) because the discharge sensor 69*c* is in the ON state at the timing S similarly to the second example.

More specifically, the CPU core 59 detects the occurrence of paper jam error at timing S by executing the error detection program. The CPU core 59 determines that a paper jam error has occurred by knowing the fact that the discharge sensor 69c is in an ON state at timing S that is the predetermined length of time after timing P (not shown in FIG. 5(*c*)) when the post-registration sensor 69b has been turned OFF before timing T, at which the discharge sensor 69c has turned ON.

Next, after 2.25 seconds or more elapses, the error is cleared, although not shown in the drawing.

FIG. 5(*a*) shows the data written to the ring buffer 73 in this example, while FIG. 5(*b*) shows the results of analyzing this data.

As shown in FIG. 5(*b*), 70 msec (07 h) is stored as timing data and Sensor 3 (discharge sensor 69c)=high (31 h) is stored as port data under Data 0. Next, overflow (FFh) is stored as timing data and Sensor 12 (cover sensor 72)=cover open (12 h) is stored as port data under Data 1. 0 msec (00 h) is stored as timing data and motor (main motor 62)=low (40 h) is stored as port data under Data 2. 10 msec (01 h) is stored as timing data and Sensor 12 (cover sensor 72) cover close (12 h) is stored as port data under Data 3. 50 msec (05 h) is stored as timing data and error set (FFh) is stored as port data under Data 4. In addition, 0 msec (00 h) is stored as dummy timing data and the error type JAM error (54 h) is stored as port data under Data 4. Overflow (FFh) is stored as timing data and error clear (FEh) is stored as port data under Data 5. In addition, 0 msec (00 h) is stored as dummy timing data and the error type JAM error (54 h) is stored as port data under Data 5. This data indicates that the error has been cleared 2.25 seconds or more after the timing in Data 4.

If the laser printer 1 is in the output enable mode, the laser printer 1 outputs data of FIG. 5(*a*) when the error occurs or when the error is cleared. Analyzing the outputted results, the operator obtains the timing chart of FIG. 5(*c*). This timing chart shows that the cover sensor 72 has detected 50 msec prior to the error-detection timing S that the front cover 2a is in an open state for a period of exactly 10 msec between the timings U and V. This timing chart also shows that the CPU core 59 turns OFF the operation signal for the main motor 62 at timing U in response to the ON detection signal from the cover sensor 72, and that the operation signal continues in the OFF state from timing U even after timing V. Based on this data, the operator determines that the error detected by the error detection program is caused not by the paper 3 being unable to pass over the discharge sensor 69c, but is caused because the front cover 2a is temporarily opened and closed due to vibrations. The opening of the front cover 2a halts the main motor 62 for safety purposes, resulting in the paper 3 remaining in contact with the discharge sensor 69c without being conveyed. In this case, the operator knows that measures should be taken to prevent the front cover 2a from easily opening and closing due to vibrations.

Hence, the operator can confirm the operational history up to the point that the error is generated and can thereby easily analyze the cause of the error. By analyzing detection signals along the paper-conveying path, it is particularly easy to determine the cause of an error generated by a paper jam. As a result, the operator can perform an accurate analysis of the cause of errors occurring from paper jams.

Since the laser printer 1 enables the operator to analyze generated errors by linking the plurality of sensors 58 and the plurality of operating members 57 in this way, the operator can achieve a detailed analysis of the cause of errors.

Because the laser printer 1 is provided with the ring buffer 73 and is stored with the storage control program and the output program, it is very useful for the manufacturer to accurately inspect the laser printer 1 prior to shipment and to accurately perform repairs at maintenance-service centers after shipment. It is possible to quickly and accurately analyze the cause of errors in order to take proper measures.

In other words, when inspecting or repairing the laser printer 1, the operator (inspector or maintenance-service operator) executes his/her desired settings on the laser printer 1 to bring the laser printer 1 into the output enable mode. The operator further executes his/her desired settings on the laser printer 1 so that the laser printer 1 will output the data in the ring buffer 73 to the personal computer 74, for example. In this case, when an error has occurred, the operator inputs his/her instruction to execute the output program. As a result, results of error detection, as well as detection signals by the sensors 58 and operation signals outputted to the operating members 57 over a prescribed period (which corresponds to the capacity (1,024 bytes, in this example) of the ring buffer 73) until the point that the error is detected are outputted to the personal computer 74. Accordingly, the operator (inspector or maintenance-service operator) can easily view the outputted data on the CRT screen of the personal computer 74 and quickly analyze the cause of the error.

Alternatively, the operator may perform settings on the laser printer 1 so that the laser printer 1 will directly print out the data in the ring buffer 73. The operator can immediately view the output data on the paper 3 printed out by the laser printer 1 and quickly analyze the cause of the error.

Further, the operator may perform settings on the laser printer 1 so that the laser printer 1 will output data in the ring buffer 83 to the NVRAM 56. When data is outputted to the NVRAM 56, the laser printer 1 itself stores the data even when the power to the laser printer 1 is temporarily turned off. Therefore, the operator can later control the laser printer 1 to output the data to the personal computer 74 or to the paper 3 and analyze the cause of the error on the personal computer 74 or on the paper 3.

In the mode selection program, the operator can also set the laser printer 1 to automatically output the data in the ring buffer 73 when an error is detected during the output enable mode or when a detected error is cleared during the output enable mode. With this setting, data is automatically outputted at a timing when an error occurs or a timing when the error is cleared. This enables the operator to analyze the cause of the error efficiently.

The operator performs settings to select either the output enable mode or the output disable mode using the mode selection program. The laser printer 1 will output data stored in the ring buffer 73 only when necessary. It is therefore possible to improve the efficiency of processing in the laser printer 1 by reducing unnecessary processes.

More specifically, the operator selects the output enable mode when inspecting or repairing the laser printer 1. Accordingly, data stored in the ring buffer 73 is outputted for the operator's inspection. The operator selects the output disable mode for all other uses. For example, after inspecting the laser printer 1 and before shipping the laser printer 1, the inspector selects the output disable mode. Data in the ring buffer 73 will not be outputted when a user who has purchased the laser printer 1 is using the laser printer 1. Similarly, after repairing the laser printer 1 and before returning the laser printer 1 back to the user, the maintenance-service operator selects the output disable mode. It is possible to reduce unnecessary processes by not outputting data stored in the ring buffer 73.

As described above, according to the laser printer 1 of the present embodiment, by executing the storage control program, the CPU core 59 stores detection signals from the sensors 58, operation signals outputted to the operating members 57, and error-indicating signals in a time series in the ring buffer 73 whenever a change occurs in any of these data. The CPU core 59 outputs the data stored in the ring buffer 73 to the personal computer 74, for example, based on the output program. Accordingly, the operator can view the history of detection signals outputted from the sensors 57 and the operation signals outputted to the operating members 57 up to the point that the error is generated on the CRT screen of the personal computer 74. The operator can easily analyze the cause of the generated error.

While the invention has been described in detail with reference to the specific embodiment thereof, it would be apparent to those skilled in the art that various changes and modifications may be made therein without departing from the spirit of the invention.

For example, in the embodiment described above, the timing data indicates the length of time elapsed up to the time when data is currently being written to the ring buffer 73 from the time when data has been written to the ring buffer 73 at the latest. However, the timing data may indicate the length of time elapsed from the time at which the power to the laser printer 1 has been turned on until the current writing, provided that the RAM 55 has sufficient capacity.

In the embodiment described above, the port data indicative of the status of the detection signals, the operation signals, and the error-indication signals are stored in the ring buffer 73. However, port data indicative of other conditions or status of the laser printer 1 may be stored in the ring buffer 73. For example, data indicative of whether power to the laser printer 1 is in an ON state; data indicative of whether the laser printer 1 is in a warm-up state; data indicative of whether the laser printer 1 is in a sleep state; and data indicative of whether the laser printer 1 is performing a printing process may be stored as port data.

In the above-described embodiment, the present invention is applied to a laser printer 1, but the present invention can also be applied to an inkjet printer or image forming devices of other types.

Further, in the above-described embodiment, the NVRAM 56 is used as the nonvolatile memory, but flash memory may also be used as nonvolatile memory in the present invention.

In the above-described examples, the pre-registration sensor 69a, post-registration sensor 69b, discharge sensor 69c, and cover sensor 72 are used as examples of the sensors 58, and the main motor 62 is used as an example of the operating member 57. However, other various components (sensors 58 and operation members 57) can be connected to the ports 80 in the ASIC 53 so that the states of those components will be used in the analysis of error causes.

What is claimed is:

1. An image-forming device comprising:
   an image forming portion forming images on an image recording medium;
   a signal-generating portion generating a status-indicating signal indicative of a status of the image forming portion;
   an error determining portion determining, based on the status-indicating signal, a type of an error that occurs in the image forming portion;
   a storage portion in which data of the status-indicating signal and data of the type of the error in association with time interval data indicative of a series of time are stored; and
   a storage control portion that controls storing, in the storage portion, data of the status-indicating signal and data of the type of the error in association with time interval data indicative of a series of time.

2. An image-forming device according to claim 1, wherein the storage control portion stores, in the storage portion, data of the status-indicating signal when the status-indicating signal changes.

3. An image-forming device according to claim 2, wherein the time interval data indicates time intervals between successive timings when the status-indicating signal changes in succession.

4. An image-forming device according to claim 3, wherein when the status-indicating signal changes, the storage control portion stores the status-indicating signal data and timing data as the time interval data, the timing data indicating a length of time that has been elapsed from when the status-indicating signal has changed latest until the time when the status-indicating signal presently changes.

5. An image-forming device according to claim 4, wherein the storage control portion includes a timing portion that measures time which has been elapsed from when the status-indicating signal has changed latest until when the status-indicating signal presently changes, the timing portion stopping measuring the elapsed time when a length of the elapsed time reaches a predetermined time, thereby allowing the time interval data to have either one of a value smaller than or equal to the predetermined time and an overflow value indicative of a value greater than the predetermined time.

6. An image-forming device according to claim 1,
   wherein the image forming portion includes at least one operating member that operates to form images on the image recording medium,
   wherein the signal-generating portion includes:
   an operation signal supplying portion supplying at least one electric operation signal to the at least one operating member, each operating member operating in accordance with the received operation signal,
   at least one sensor detecting at least one portion in the image forming portion and generating at least one detection signal;
   an error detection portion determining that an error has occurred and cleared based on the at least one detection signal generated from the at least one sensor and generating an error signal indicative of an error, and
   wherein the status-indicating signal includes at least one of the at least one electric operation signal, the at least one detection signal, and the error signal.

7. An image-forming device according to claim 1, further comprising an output portion outputting the status-indicating signal data, which is stored in association with the time interval data in the storage portion.

8. An image-forming device according to claim 7, further comprising:
   a connection portion connected to an external device;
   a power source; and
   a nonvolatile memory,
   wherein the output portion outputs the data of the status-indicating signal to either one of the external device, the nonvolatile memory, and the image forming portion,
   the nonvolatile memory maintaining the data of the status-indicating signal after the power source is turned off when the nonvolatile memory receives the data of the status-indicating signal, the image forming portion forming an image of the data of the status-indicating signal onto the image recording medium when the image forming portion receives the data of the status-indicating signal.

9. An image-forming device according to claim 8, further comprising an output selection portion enabling an operator to select one of the external device, the nonvolatile memory, and the image forming portion, to which the operator desires to output the data of the status-indicating signal.

10. An image-forming device according to claim 7, further comprising:
a mode selection portion enabling an operator to select one of an output enable mode and an output disable mode; and
a mode setting portion setting the output portion into the operator's selected mode, the output portion in the output enable mode executing its output operation, the output portion in the output disable mode failing to execute its output operation.

11. An image-forming device according to claim 7, wherein the output portion automatically outputs the data of the status-indicating signal when the status-indicating signal indicates occurrence of error.

12. An image-forming device according to claim 11, wherein the output portion outputs the data of the status-indicating signal that has changed within a predetermined period of time before the occurrence of error.

13. An image-forming device according to claim 7, wherein the output portion automatically outputs the data of the status-indicating signal when the status-indicating signal indicates clearance of error.

14. An image-forming device comprising:
an image forming portion forming images on an image recording medium;
a signal-generating portion generating a status-indicating signal indicative of a status of the image forming portion;
an error determining portion determining, based on the status-indicating signal, a type of an error that occurs in the image forming portion;
a storage portion in which data of the status-indicating signal and data of the type of the error merged, in the form of a series of data, with time interval data indicative of a series of time are stored; and
a storage control portion that controls storing, in the storage portion, data of the status-indicating signal and data of the type of the error merged, in the form of a series of data, with time interval data indicative of a series of time.

15. An image-forming device according to claim 14, wherein the storage control portion stores the status-indicating signal data in a series of time every time when the status-indicating signal changes.

16. An image-forming device comprising:
a housing;
an image forming portion mounted in the housing and forming images on an image recording medium, the image forming portion including an operating member that operates to form images on the image recording medium;
an operation signal supplying portion supplying an operation signal to the operating member, the operating member operating in accordance with the operation signal;
a sensor disposed in the housing and detecting a status of the image forming portion and generating a detection signal;
a storage portion in which data of the detection signal and data of the operation signal that the operation supplying portion has supplied to the operating member, in association with time data indicative of a series of time, are stored; and
a storage control portion that controls storing, in the storage portion, data of the detection signal and data of the operation signal that the operation supplying portion has supplied to the operating member, in association with time data indicative of a series of time.

17. An image-forming device according to claim 16, wherein when the detection signal changes, the storage control portion stores the detection signal data and time data indicative of when the detection signal changes.

18. An image-forming device according to claim 17, further comprising an error detection portion determining that an error has occurred based on the detection signal generated from the sensor;
wherein the storage control portion further stores, in the storage portion, data indicative of the occurrence of error determined by the error detection portion in association with time data indicative of when the error has occurred.

19. An image-forming device according to claim 18, wherein when the error detection portion determines that an error has occurred, the storage control portion stores the error data and time data indicative of when the error has occurred.

20. An image-forming device according to claim 19, wherein the error detection portion determines that the error has been cleared based on the detection signal generated from the sensor;
wherein the storage control portion further stores, in the storage portion, data indicative of the clearance of error determined by the error detection portion in association with time data indicative of when the error has been cleared.

21. An image-forming device according to claim 20, wherein when the error detection portion determines that an error has been cleared, the storage control portion stores the error data and time data indicative of when the error has been cleared.

22. An image-forming device according to claim 16, wherein the image forming portion includes a conveying portion conveying the image recording medium, and
wherein the sensor include a recording medium conveying state detection sensor detecting a conveying state of the image recording medium.

23. An image-forming device according to claim 16, wherein the sensor includes a plurality of sensors, each detecting a corresponding status of the image forming portion and generating a detection signal, and
wherein the storage control portion stores, in the storage portion, data of the detection signal generated from each sensor in association with the time data.

24. An image-forming device according to claim 16, wherein when the operation signal changes, the storage control portion stores the operation signal data and time data indicative of when the operation signal changes.

25. An image-forming device according to claim 24, further comprising an output portion outputting the detection signal data and its associated time data, the error occurrence data and its associated time data, the error clearance data and its associated time data, and the operation signal data and its associated time data.

26. An image-forming device according to claim 25, wherein the output portion outputs the data of the error occurrence, the data of the error clearance, and the data of the detection signal and the operation signal that have changed during a prescribed time period up until the error has occurred.

27. An image-forming device according to claim 26, further comprising a connection portion connected to an external device, and
wherein the output portion includes an external device output portion outputting the detection signal data and its associated time data, the error occurrence data and its associated time data, the error clearance data and its associated time data, and the operation signal data and its associated time data to the external device.

28. An image-forming device according to claim 26, further comprising a nonvolatile memory, and
wherein the output portion includes a memory output portion outputting the detection signal data and its associated time data, the error occurrence data and its associated time data, the error clearance data and its associated time data, and the operation signal data and its associated time data to the nonvolatile memory.

29. An image-forming device according to claim 26, wherein the output portion includes a print output portion controlling the image forming portion to print the detection signal data and its associated time data, the error occurrence data and its associated time data, the error clearance data and its associated time data, and the operation signal data and its associated time data on the image recording medium.

30. An image-forming device according to claim 26, further comprising:
a mode selection portion enabling an operator to select one of an output enable mode and an output disable mode; and
a mode setting portion setting the output portion into the operator's selected mode, the output portion in the output enable mode executing its output operation, the output portion in the output disable mode failing to execute its output operation.

31. An image-forming device according to claim 26, wherein the output portion executes its output operation when the error detection portion determines that an error has occurred.

32. An image-forming device according to claim 26, wherein the output portion executes its output operation when the error has been cleared.

33. An image-forming device according to claim 24, wherein the storage control portion includes a timing portion measuring time which has been elapsed from a first time when the storage control portion has written data of either one of the detection signal data, the operation signal data, the error occurrence data, and the error clearance data latest until when the storage control portion presently writes data of either one of the detection signal data, the operation signal data, the error occurrence data, and the error clearance data, the storage control portion presently storing the time data that is indicative of a length of the measured time.

34. An image-forming device according to claim 33, wherein the timing portion stops measuring the elapsed time when the length of the elapsed time reaches a predetermined value.

35. An image forming device according to claim 16, further comprising an error determining portion determining, based on the detection signal, a type of an error that occurs in the image forming portion;
wherein the storage control portion controls storing, in the storage portion, data of the type of the error in association with the time data.

* * * * *